United States Patent [19]

Hertel et al.

[11] 3,961,886

[45] June 8, 1976

[54] PROCESS FOR THE DYEING AND PRINTING OF CELLULOSE-CONTAINING TEXTILE MATERIALS

[75] Inventors: Hasso Hertel, Mulheim; Willy Gronen, Kelkheim, Taunus, both of Germany

[73] Assignee: Hoechst Aktiengesellschaft, Frankfurt am Main, Germany

[22] Filed: Sept. 12, 1974

[21] Appl. No.: 505,463

[30] Foreign Application Priority Data

Sept. 15, 1973  Germany............................ 23465034

[52] U.S. Cl............................................ 8/44; 8/49; 8/542; 8/168 R; 8/71

[51] Int. Cl.$^2$............................................. D06P 1/02

[58] Field of Search........................................ 8/44, 49

[56] References Cited
UNITED STATES PATENTS

| | | |
|---|---|---|
| 3,288,552 | 11/1966 | Streck........................................ 8/44 |
| 3,425,785 | 2/1969 | Hertel........................................ 8/46 |
| 3,516,780 | 6/1970 | Kirst et al................................... 8/44 |
| 3,642,424 | 2/1972 | Lowenfeld et al........................... 8/21 |
| 3,679,350 | 7/1972 | Lowenfeld et al......................... 8/21 C |
| 3,713,767 | 1/1973 | Lowenfeld et al......................... 8/21 C |

*Primary Examiner*—Joseph L. Schoffer
*Assistant Examiner*—A. L. Clingman
*Attorney, Agent, or Firm*—Curtis, Morris & Safford

[57] ABSTRACT

Continuous dyeing and printing of cellulose fibre material by impregnating the material with a 2-hydroxy-naphthalene-3-carboxylic acid phenyl amide, alkali and nitrite, by crosspadding or over-printing with a dispersion or emulsion of a 4-amino-diphenyl amine as well as acid or acidic salt, and bringing about the development of the dyestuff by drying the fiber material and/or exposing it to sodium carbonate.

1 Claim, No Drawings

PROCESS FOR THE DYEING AND PRINTING OF CELLULOSE-CONTAINING TEXTILE MATERIALS

In ice color dyeing and printing it is possible to produce blue shades by coupling with diazo compounds of a 4,4'-diamino-3,3'-dialkoxy-diphenyl, a 5-amino-2-acylamino-1,4-dialkoxy-benzene or a 4-aminodiphenylamine. The last-mentioned group of compounds is particularly important due to the high fastness to light of the dyeings and prints obtained with them. However, it is distinguished by the other diazo compounds used in this branch of dyeing by its much smaller coupling capacity, which requires special methods of dyestuff formation, for example a sodium carbonate passage, since the best possible value for its dyestuff coupling is at pH 7 to 8. Furthermore, in the diazotation of the basic bases, N-nitroso-diphenylamino-4-diazonium salts coupling with a brown color are formed; therefore, in dyeing and printing, only the color salts of this group of compounds — i.e. the diphenyl amine diazonium salts with a free amino-hydrogen — and not the bases may be used.

It has now been found that it is possible to produce in a very simple way on textile material consisting of or containing cellulose, the azo dyestuffs of hydroxy-naphthalene-3-carboxylic acid phenyl amides and 4-amino-diphenyl-amines on the fiber, when padding the fiber material first with a preferably hot aqueous solution which contains a 2-hydroxy-naphthalene-3-carboxylic acid phenyl amide, an alkaline agent and an alkali metal nitrite, preferably sodium nitrite, cross-padding the material thus impregnated, expediently after an intermediate drying, under conditions of room temperature, with a second aqueous bath or printing with a printing paste, which contain a solution, a dispersion or an emulsion of a 4-aminodiphenyl amide as well as an acidic agent and bringing about the formation of the azo dyestuff by diazotation and coupling by a drying process, if desired with the aid of an elevated temperature and/or a subsequent passage of the dyeings and prints through a hot sodium carbonate solution. The material thus treated is finished in usual way by rinsing, soaping, rinsing once more and drying.

To carry out the new process there are considered as coupling components, apart from the 2-hydroxy-naphthalene-3-carboxylic acid-phenyl amide the derivatives thereof substituted in the phenyl radical by alkyl or alkoxy radicals or by chlorine atoms, as for example 2-hydroxy-naphthalene-3-carboxylic acid-(2'-methylphenyl-1')-amide, 2-hydroxy-naphthalene-3-carboxylic acid (2'-ethoxyphenyl-1')-amide or 2-hydroxy-naphthalene-3-carboxylic acid-(4'-chloro-6'-methoxyphenyl-1')-amide.

The alkaline agents in the impregnation baths used are above all aqueous solutions of the hydroxides of the alkali metals, first of all sodium hydroxide solution.

As amines suitable for the formation of the diazo component there are used besides the 4-amino-diphenyl amine itself the alkyl or alkoxy-substitution products, especially the 4'-amino-4-methoxy-diphenyl-amine and the 4-amino-3-methoxy-diphenyl amine.

To prepare the aqueous solutions of 4-amino-diphenyl amines there are expediently used easily soluble salts of these bases.

The dispersions of 4-amino-diphenyl amines required for the new process (base dispersions) may be prepared in different ways:

Thus, the dispersion may be obtained by grinding the amine in an aqueous paste, advantageously in the presence of a dispersing agent in order to avoid formation of agglomerations. This operation may be carried out in a roll or vibration mill charged with balls; especially suitable are vibration ball mills charged with glass beads or natural sand. Also a pulverization by means of a so-called dissolver often gives satisfactory results.

According to another operation mode, a solid preparation is introduced into water, this preparation being obtained by spray drying of a base dispersion containing a solid dispersing agent, or by grinding of a mixture of a solid dispersing agent and the amine, for example in a disk attrition mill.

It is also possible to prepare the dispersion only in the padding liquor, for example by introducing a solution of the amine and a dispersing agent in a water-soluble organic solvent into the aqueous padding liquor.

The dispersing agents used may be of the cationic, anionic or non-ionic kind and, for example, belong to the following classes of substances:

Alkyl-polyglycol ethers such as alkylene-oxide addition products on fatty alcohols, for example stearyl, coconut fatty alcohol or oleyl alcohol; alkylaryl-polyglycol ethers such as alkylene-oxide addition products on nonyl phenol; arylpolyglycol ethers; alkylamine oxethylates; trialkyl-aralkyl-ammonium salts such as trialkyl-benzyl-ammonium chlorides; trialkyl-phosphinoxides such as dodecyl-dimethyl-phosphinoxide; alkylaryl-sulfonates such as isobutyl-naphthalene-sulfonic acid-Na-salt; arylsulfonates; lignin sulfonates; sulfonated cresol-formaldehyde resins; formaldehyde-naphthalene-sulfonic acid condensation products; carbacyl-aminosulfonic acids such as N-oleoyl-N-methyl-taurine and other products.

According to the present invention the maximum grain size of the dispersed 4-amino-diphenyl amine shall be identical to or smaller than 0.03 mm.

Emulsions of the amines may be prepared for example by introducing solutions of the 4-amino-diphenyl amines into mixtures of tensides and water-soluble organic solvents or into tensides only. As tensides there are considered especially ethylene-oxide addition products, as organic solvents especially alkylmono- or diglycol ethers or ethylene-glycol itself.

As acidic agents which are present in the second padding baths or printing pastes in order to make possible the formation of the diazonium compound from the amine and the nitrite and thus, the coupling to form the azo dyestuff, there are mostly used organic acids, as for example formic acid, acetic acid, glycolic acid, lactic acid, gluconic acid, tartric acid, citric acid or mixtures of these acids. But there may also be used certain inorganic acid salts such as monosodium-dihydrogen-phosphate, sodium-hydrogen sulfate or aluminium sulfate.

According to the present invention the formation of the blue dyestuffs desired takes place during the intermediate drying preceded by printing or padding, at temperatures above 80°C or by a passage through a hot sodium carbonate solution. In contradistinction thereto, with the same after-treatment, after printing or padding a diazo solution of 4-amino-diphenyl amines obtained as usual, onto a material impregnated with coupling components, the brown violet shades of the dyestuffs containing nitroso groups are formed.

The following Examples illustrate the invention, without limiting it thereto. The color Index Numbers indicated in the Examples for the dyestuffs used are taken from the third edition 1971. Parts and percentages for the substances are by weight unless stated otherwise.

EXAMPLE 1

A cotton fabric was padded on a foulard machine (liquor pick-up 800 g/kg of dry material) with a hot solution which was prepared by introducing 2 parts of 2-hydroxy-naphthalene-3-carboxylic acid-(4'-methoxy-phenyl-1')-amide, while stirring, into a mixture of 2 parts of a 38 % sodium hydroxide solution, 0.8 part of a protein degradation product/fatty acid condensate as well as 110 parts of a hot water, by subsequent boiling and addition of 3.6 parts of sodium nitrite.

After drying the material thus impregnated was padded on the second foulard machine (liquor pick-up 800 g/kg of dry material) with a dyebath at room temperature which was prepared as follows:

4.5 Parts of a solution of one part each of 4-amino-diphenylamine, methyl glycol and castor oil-ethylene oxide condensate were introduced while stirring into a solution of 7.5 parts of a 85 % formic acid in 100 parts of water.

The padded material was dried in the air stream at 80°C and then rinsed as usual, washed and dried. A full even blue dyeing was obtained.

EXAMPLE 2

A bleached and mercerized cotton fabric was padded on a foulard machine with a hot impregnation bath which was prepared as follows:

A mixture of 20 parts of ethanol, 10 parts of a 38 % sodium hydroxide solution and 30 parts of water of 40°C was poured onto 20 parts of 2-hydroxy-naphthalene-3-carboxylic acid phenyl amide (C.I. No. 37505) which was dissolved by stirring. This standard solution was introduced into a hot solution of 10 parts of a 38 % sodium hydroxide solution, 10 parts of a protein degradation product/fatty acid condensate and 30 parts of sodium nitrite in 900 parts of hot water.

The liquor pick-up was 800 g per kg of dry material. After a short exposition to air the material was dried and then printed on a roller printing machine with a printing paste prepared as follows:

20 Parts of a 50 % solution of 4-amino-diphenylamine in methyl-glycol were stirred to a paste with 200 parts of water and, after addition of 30 parts of formic acid and 40 parts of lactic acid, introduced, while stirring, into 400 parts of a usual hydroxyethyl cellulose thickening and filled up to 1000 parts of paste with water or thickening.

After the usual after-treatment a dark blue pattern was obtained on the material with a very good color yield and the usual good fastness properties.

A blue pattern was also obtained on the fabric when instead of the above-mentioned preparation the following printing paste was used:

33 Parts of a 30 % aqueous dispersion of 4-amino-4-methoxy-diphenyl amide (with 7 % of a tenside of the formula

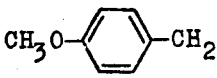 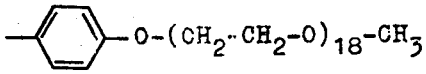

as dispersing agent) were stirred with 200 parts of water and after addition of 40 parts of a 85 % formic acid and 20 parts of monosodium phosphate, introduced, while stirring, into 400 parts of a usual hydroxyethyl cellulose thickening and then filled up to 1000 parts of a paste with water or thickening.

EXAMPLE 3

A cotton fabric impregnated as in Example 2 was padded after the intermediate drying on the foulard machine (liquor pick-up 100 % by weight) with a further dyebath of room temperature, which was prepared as follows:

3.5 Parts of a 40 % aqueous dispersion of 4-amino-3-methoxy-diphenylamine (with 10 % of a lignin sulfonate as dispersing agent) were introduced, while stirring, into a solution of 2 parts of a castor oil-ethylene oxide condensation product in 100 parts of water; then 2 parts of lactic acid and 3 parts of acetic acid were added.

After padding the textile material thus treated was exposed to air and then to a sodium carbonate passage (30 g of soda/l of water), then rinsed as usual, washed and dried. A blue dyeing of a good evenness was obtained.

We claim:
1. A process for the continuous dyeing and printing of textile material consisting of or containing cellulose fibers, with water-insoluble azo dyestuffs produced on the fiber, which comprises padding the fiber material with an aqueous solution which contains a 2-hydroxy-naphthalene-3-carboxylic acid phenyl amide, an alkaline agent and an alkali metal nitrite, cross-padding the material thus impregnated, under conditions of room temperature, with a second aqueous bath or printing with a printing paste containing a solution, a dispersion or an emulsion of a 4-amino-diphenyl amine as well as an acidic agent, and bringing about the formation of the azo dyestuff by diazotizing and coupling by a drying process, if desired with the aid of an elevated temperature, a subsequent passage of the dyeings and prints through a hot sodium carbonate solution or both said elevated temperature and sodium carbonate treatment steps.

* * * * *